June 22, 1926.

J. SCHUMACHER 1,589,569

METHOD OF MAKING PLASTER BOARD LATH

Filed July 7, 1924

Inventor
John Schumacher
by Westall and Wallace
his Attorneys

Patented June 22, 1926.

1,589,569

UNITED STATES PATENT OFFICE.

JOHN SCHUMACHER, OF LOS ANGELES, CALIFORNIA.

METHOD OF MAKING PLASTER-BOARD LATH.

Application filed July 7, 1924. Serial No. 724,689.

Figure 1:
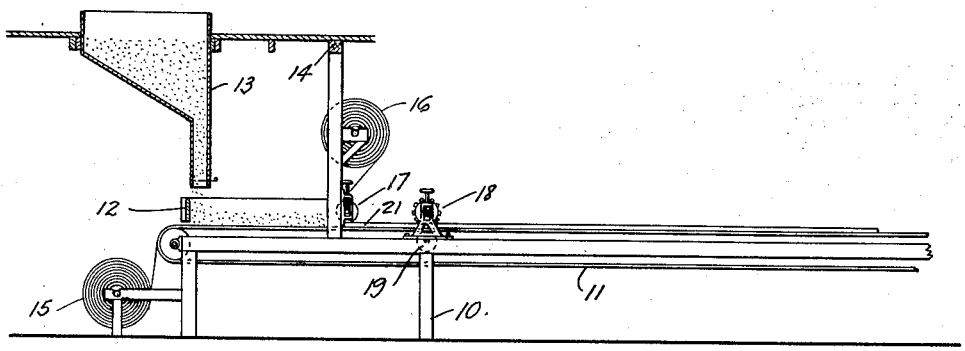
Figure 2:
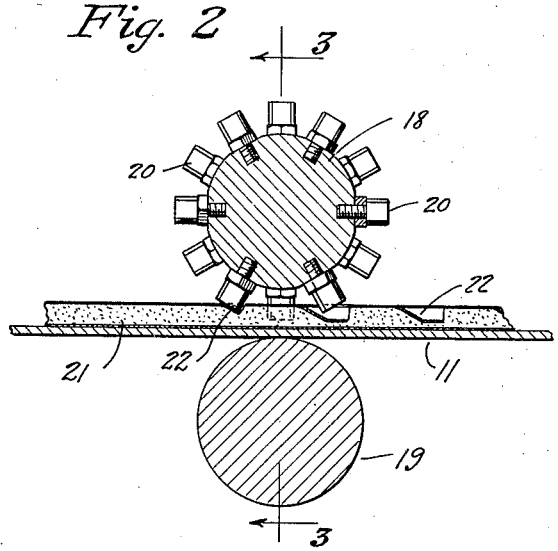
Figure 3:
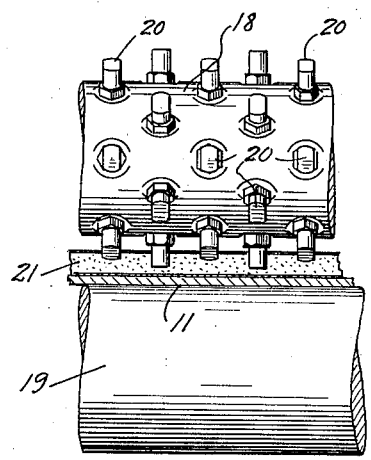
Figure 4:
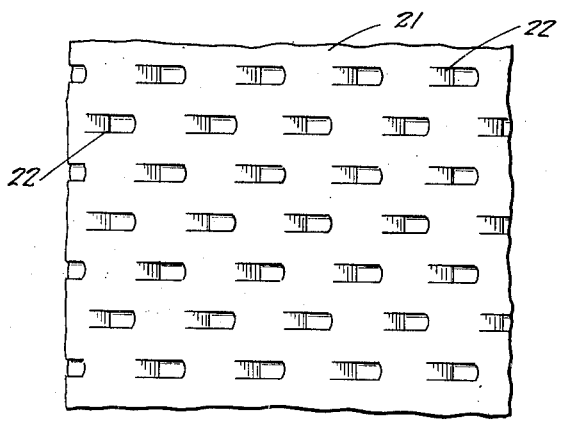

This invention relates to a process or method for the formation of plaster lath comprising a cementitious core and covering of pliable fibrous material. More particularly, the lath comprises a plaster board of the character described having indentations in a surface thereof, in which portions of a plastic body applied thereto as a coating may intrude and thereby become anchored thereto. Heretofore, lath of this character has been made by operating upon dry finished plaster board with a tool. Such a process is disclosed in United States Patent 1,177,361, for plaster board lath, dated March 28, 1916. I also disclosed a method for making plaster board lath in United States Patent 1,487,894, granted to me March 25, 1924. This last mentioned process consists in cutting slits in a paper face sheet before formation of the board and maintaining depressions during formation of the green board. The present process differs from these in that a board is formed and while in the soft or green state, the indentations are formed therein. Herein is illustrated a particular type of machine for carrying out the steps of my process and specific material for composition of the board, but the invention is in no way limited to either the materials or the machine illustrated herein. These are disclosed for illustrative purposes only. A form of my improved lath may be made by continuously advancing pliable fibrous sheets, interposing during their advance an unstable plastic material to produce a soft green plaster board. During the advance of and after the formation of the green board, an endless travelling former having punches acts upon the board to produce pockets in a surface thereof, said pockets having bottoms lined with a flap cut from the covering sheet. Suitable machinery for carrying out the process is illustrated in the accompanying drawing, in which:

Fig. 1 is a side elevation showing in a conventional manner a machine for carrying out my process; Fig. 2 is an enlarged vertical cross section of a fragment of the machine showing details of the former; Fig. 3 is a side elevation of a fragment of the former as seen looking in the direction of the arrows 3 of Fig. 2; and Fig. 4 is a face view of a fragment of a plaster lath made in accordance with my invention.

Referring more particularly to the drawing, a frame indicated by 10 supports an endless conveyor 11. Mounted above the conveyor at one end is a mud box 12, from which the plastic material is fed between covering sheets. A hopper 13 for supplying plastic material to the mud box is suspended from the frame work 14. A roll of paper 15 for supplying the under sheet of the board is journalled on the frame, the web from the sheet passing onto the conveyor belt. A paper supply roll 16 is journalled on the frame work 14, the web thereof being passed around a pressure roller 17 and forming the upper cover sheet of the plaster board. The structure just described is that typical of machines used for making plaster board. Green board is advanced by the conveyor and acted upon by the former later described. After indentation, the board is severed into suitable lengths and then acted upon so as to permit setting of the plastic material, drying of the board, trimming or any other steps which may be found advisable.

Mounted upon the frame and above the upper ply of the conveyor is the former. It comprises a roller 18 journalled in bearings mounted upon the frame 10 and positioned with its axis transverse to the travel of the board. Disposed below the upper ply of the belt is a supporting roller 19 cooperating with the former. Projecting from the cylindrical surface of the former are punches which form the pockets in the plaster board. The former may ride upon the advancing plaster board as shown in Figs. 1 and 2. It is obvious that, if desired, the former may be positively driven.

The green plaster board indicated by 21 advances in a soft wet state from beneath the pressure roller 17. As it passes beneath the former, the punches 20 revolving with the former and in the direction of the advancing board, meet the latter and are forced into the body thereof. At the initial place of engagement of a punch with the board, the cover sheet is cut to form a flap 22. The flap is then pressed by the plunger into the plastic body, but retains its connection to the body of the covering sheet at the rear, thereby forming a pocket having a flap 22 of the cover sheet inclining downwardly from the surface. The formed plaster lath emerges from beneath the former 18, is advanced by the conveyor and thereafter the usual steps may be followed in further treatment of the board.

The primary feature of the present invention resides in forming pockets in the green board after its emergence from the board forming mechanism and while in its green state. The carrying on of this process is in no way limited to the utilization of the specific materials or of the particular mechanism just described.

What I claim is:

1. The process of forming plaster lath or the like, comprising advancing a plastic body having a pliable covering sheet thereover to form a green plaster board, thereafter depressing limited areas of said board so as to cut and form flaps from the covering sheet, and depressing said flaps to express the plastic material to form pockets having bottom linings formed by said flaps.

2. The process of forming plaster lath or the like comprising advancing pliable covering sheets, interposing therebetween a plastic material to form a green plaster board, thereafter depressing limited areas of said board so as to cut and form flaps from the covering sheets, and depressing said flaps to express plastic material to form pockets having bottom linings formed by said flaps.

3. The process of forming plaster lath or the like comprising advancing a plastic body having a pliable covering sheet thereover to form a green plaster board; moving punching bodies with the advance of said formed board toward the latter so as to cut and form flaps from the covering sheet, depress said flaps to express plastic material to form pockets having bottom linings formed by said flaps and then withdraw said bodies from said pockets.

4. The process of forming plaster lath or the like comprising advancing a plastic body having a covering sheet thereover to form a green plaster board; moving punching bodies in an arcuate path with the advance of said formed board so as to cut and form flaps from the covering sheets, depress said flaps to express plastic material to form pockets having bottom linings formed by said flaps and withdraw said bodies.

5. The process of forming plaster lath or the like, comprising advancing pliable covering sheets, interposing therebetween a plastic material to form a green plaster board; moving punching bodies in an arcuate path with the advance of said formed board so as to cut and form flaps from the covering sheets, depress said flaps to express plastic material to form pockets having bottom linings formed by said flaps and withdraw said bodies.

In witness that I claim the foregoing I have hereunto subscribed my name this 27th day of June, 1924.

JOHN SCHUMACHER.